(12) United States Patent
Bernhoff

(10) Patent No.: US 8,334,612 B2
(45) Date of Patent: Dec. 18, 2012

(54) WIND-POWER UNIT WITH VERTICAL AXIS

(75) Inventor: Hans Bernhoff, Uppsala (SE)

(73) Assignee: Vertical Wind AB, Uppsala (SE)

(*) Notice: Subject to any disclaimer, the term of this patent is extended or adjusted under 35 U.S.C. 154(b) by 501 days.

(21) Appl. No.: 12/451,609

(22) PCT Filed: Jun. 10, 2008

(86) PCT No.: PCT/SE2008/050693
§ 371 (c)(1),
(2), (4) Date: Nov. 20, 2009

(87) PCT Pub. No.: WO2008/153491
PCT Pub. Date: Dec. 18, 2008

(65) Prior Publication Data
US 2010/0066094 A1 Mar. 18, 2010

(30) Foreign Application Priority Data
Jun. 11, 2007 (SE) ........................................ 0701407

(51) Int. Cl.
*F03D 9/00* (2006.01)
(52) U.S. Cl. ............................. 290/55; 52/40; 52/651.01
(58) Field of Classification Search .................... 290/55, 290/44; 52/295, 296
See application file for complete search history.

(56) References Cited

U.S. PATENT DOCUMENTS

| | | | |
|---|---|---|---|
| 3,935,490 A * | 1/1976 | Spirk | 310/91 |
| 4,258,280 A * | 3/1981 | Starcevic | 310/157 |
| 4,610,117 A * | 9/1986 | Schambeck et al. | 52/223.11 |
| 4,720,238 A * | 1/1988 | Daux | 415/172.1 |
| 4,752,436 A * | 6/1988 | Snyder | 376/285 |
| 5,379,331 A * | 1/1995 | Brouttelande | 376/285 |
| 6,320,273 B1 | 11/2001 | Nemec | |
| 6,826,873 B2 * | 12/2004 | Valencia | 52/167.2 |
| 6,979,170 B2 * | 12/2005 | Dery et al. | 415/4.2 |
| 7,126,235 B2 * | 10/2006 | Bernhoff et al. | 290/44 |
| 7,405,489 B2 | 7/2008 | Leijon et al. | |
| 7,963,740 B2 * | 6/2011 | Larsen et al. | 415/4.3 |
| 8,151,541 B2 * | 4/2012 | Aeschlimann et al. | 52/745.21 |
| 2003/0011397 A1 * | 1/2003 | Briendl et al. | 324/772 |
| 2005/0263057 A1 * | 12/2005 | Green | 114/102.1 |
| 2008/0136187 A1 | 6/2008 | Liao et al. | |

FOREIGN PATENT DOCUMENTS

WO    WO 81/00886    *    4/1981

* cited by examiner

*Primary Examiner* — Michael Zarroli
(74) *Attorney, Agent, or Firm* — Dykema Gossett PLLC

(57) ABSTRACT

A wind-power unit with a wind turbine, a generator with vertical axis a supporting pillar which supports the wind turbine, and a foundation for the supporting pillar (2). The generator includes a stator which is integrated with the foundation.

12 Claims, 3 Drawing Sheets

WIND-POWER UNIT WITH VERTICAL AXIS

FIELD OF THE INVENTION

The present invention relates in a first aspect to a wind-power unit with vertical axis comprising a wind turbine, a generator with vertical axis connected with the wind turbine a supporting pillar supporting the wind turbine and a foundation for the supporting pillar.

In a second aspect, the invention relates to an electric mains.

In a third aspect, the invention relates to a method in the production of a foundation for a wind-power unit with vertical axis, at which the foundation is arranged for a supporting pillar supporting the wind turbine of the wind power unit.

In a fourth aspect, the invention relates to a use of the invented wind-power unit.

BACKGROUND OF THE INVENTION

Recovery of wind energy has been known for thousands of years. To utilize wind power for generation of electric current has been known since the invention of the electrical generator.

However, wind power has had difficulties successfully competing economically with other energy sources for electrical energy production. The utilization of the wind power for this has for long been limited to local energy supply and test plants. Even if commercial production of wind power-based electrical energy to the mains has developed considerably during the recent decades, the share thereof of the total electrical energy production is still very marginal.

In view of the great quantity of energy that potentially is available in the wind power and in view of different disadvantages associated with electrical energy production from other types of energy sources, it is important to create opportunities for an increased quantity of commercially competitive production of electrical energy based on wind power.

The predominant technique in generation of electrical energy from wind-power units has been based on units where the wind turbine has a horizontal axis. Different types of wind turbines having vertical axis have also been proposed. Among these, Savonius rotor, Darrerius rotor and H-rotor may be mentioned. As an example of the latter kind of rotors for wind power, reference is made to U.S. Pat. No. 6,320,273 and WO 03/058059.

In order to enable a wind-power unit to generate electrical energy at competitive prices, it is important to optimize each component 5, both from a technical and an economic point of view.

The present invention has as an object to provide such an optimization as regards the foundation on which the wind-power unit rests and the co-operation of the foundation with adjacent components.

SUMMARY OF THE INVENTION

The object set forth is attained in the first aspect of the invention by the fact that a wind-power unit of the kind indicated by way of introduction has the special feature that the stator of the generator is integrated with the foundation, and a winding-supporting part connected with a frame of concrete, which frame also constitutes a part of the foundation, said part of the foundation surrounding the generator radially.

Thanks to this integration, a stable and robust anchorage is provided of the stator of the generator at the same time as it entails a cost-effective structure of the wind-power unit.

By the fact that one and the same component fulfills the double function to on one hand constitute the frame for the stator and on the other hand constitutes a part of the foundation, great cost savings are attained. Especially the total cost for the generator is considerably reduced in comparison with usage of a conventional generator.

According to an additional preferred embodiment, the winding-supporting part of the stator is connected with the frame by at least three joints distributed in the circumferential direction.

With a connection in three different spots distributed in this way, the winding-supporting part of the stator becomes entirely fixed and stably anchored.

According to a preferred embodiment, at least one of the joints comprises a coupling member arranged at the winding-carrying part of the stator and a coupling member arranged at the frame, one of the coupling members having a groove and the other coupling member comprising a clamp projecting into the groove and the joint further comprising a wedge element fixing the clamp in the groove.

Shaped in such a way, the joint becomes very simple and guarantees in addition a safe and locationally fixed anchorage of the winding-carrying part of the stator. Furthermore, such a joint has the advantage that it can be made detachable and adjustable.

According to an alternative preferred embodiment, at least one of the joints is a bolt joint.

This alternative has similar advantages that are mentioned for the closest previously mentioned embodiment.

According to an additional preferred embodiment, at least two of the joints are adjustable in the radial direction.

Thereby, an exact centering is enabled in a simple way between the rotor and stator of the generator and simple readjustment of the centering if required.

According to the second aspect of the invention, the electrical mains is connected to a wind power plant according to the invention.

According to the third aspect of the invention, the object set forth is attained by the fact that a method in the production of a foundation for a wind-power unit with vertical axis includes the special measure that the stator for a generator is integrated with the foundation, which foundation is cast in concrete and is connected with a winding-supporting part of the stator so that the foundation forms the frame of the stator, and so that the foundation surrounds the generator radially.

According to an additional preferred embodiment, the foundation is connected with the winding-supporting part of the stator by at least three joints distributed in the circumferential direction.

According to additional preferred embodiments, said joints are of a type that is defined in the preferred embodiments of the invented wind-power unit.

By the invented method and the preferred embodiments of the same, advantages are gained of the corresponding type that has been given above for the invented wind-power unit and the preferred embodiments of the same.

According to the invented use, a wind-power unit according to the invention is used to generate electrical energy.

The invention is explained in more detail by the subsequent detailed description of advantageous embodiment examples of the invention.

DETAILED DESCRIPTION OF THE PREFERRED EMBODIMENT

Figure 1:
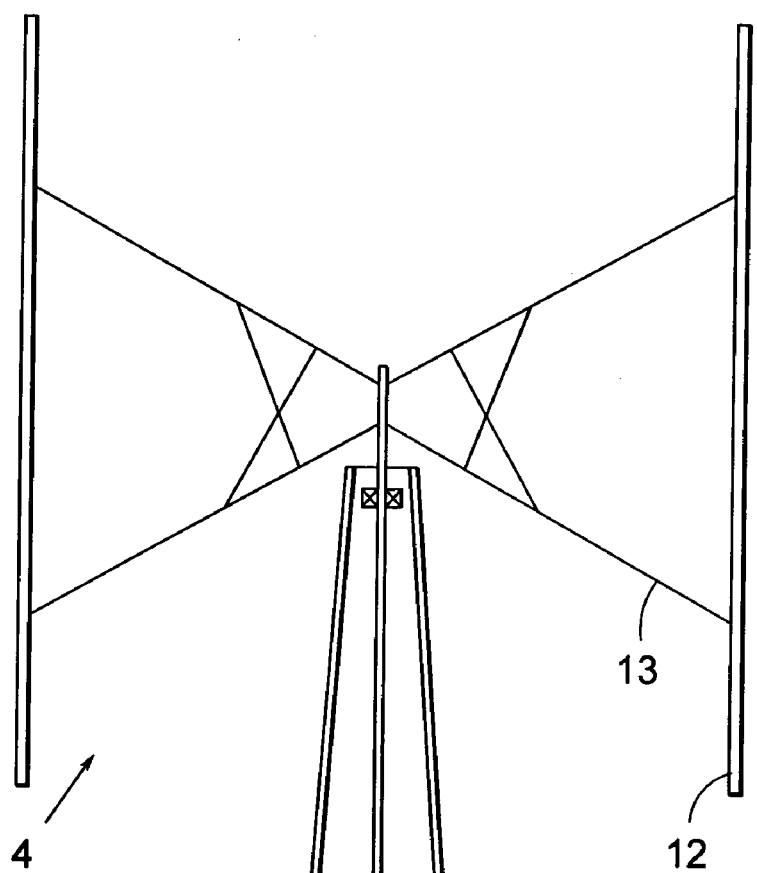
FIG. 1 is a side view of a wind-power unit according to the invention.

In FIG. 1, a wind-power unit with vertical axis according to the invention is illustrated in a side view. The wind-power unit is provided with a so-called H-rotor having vertical blades 12 fastened via supporting arms 13 at a vertical axis 3. The wind turbine 4 is carried by a supporting pillar 2, which in the example shown has a conical shape. The supporting pillar 2 rests on and is anchored on a foundation 1 of reinforced concrete partly digged down in the ground G.

Figure 2:
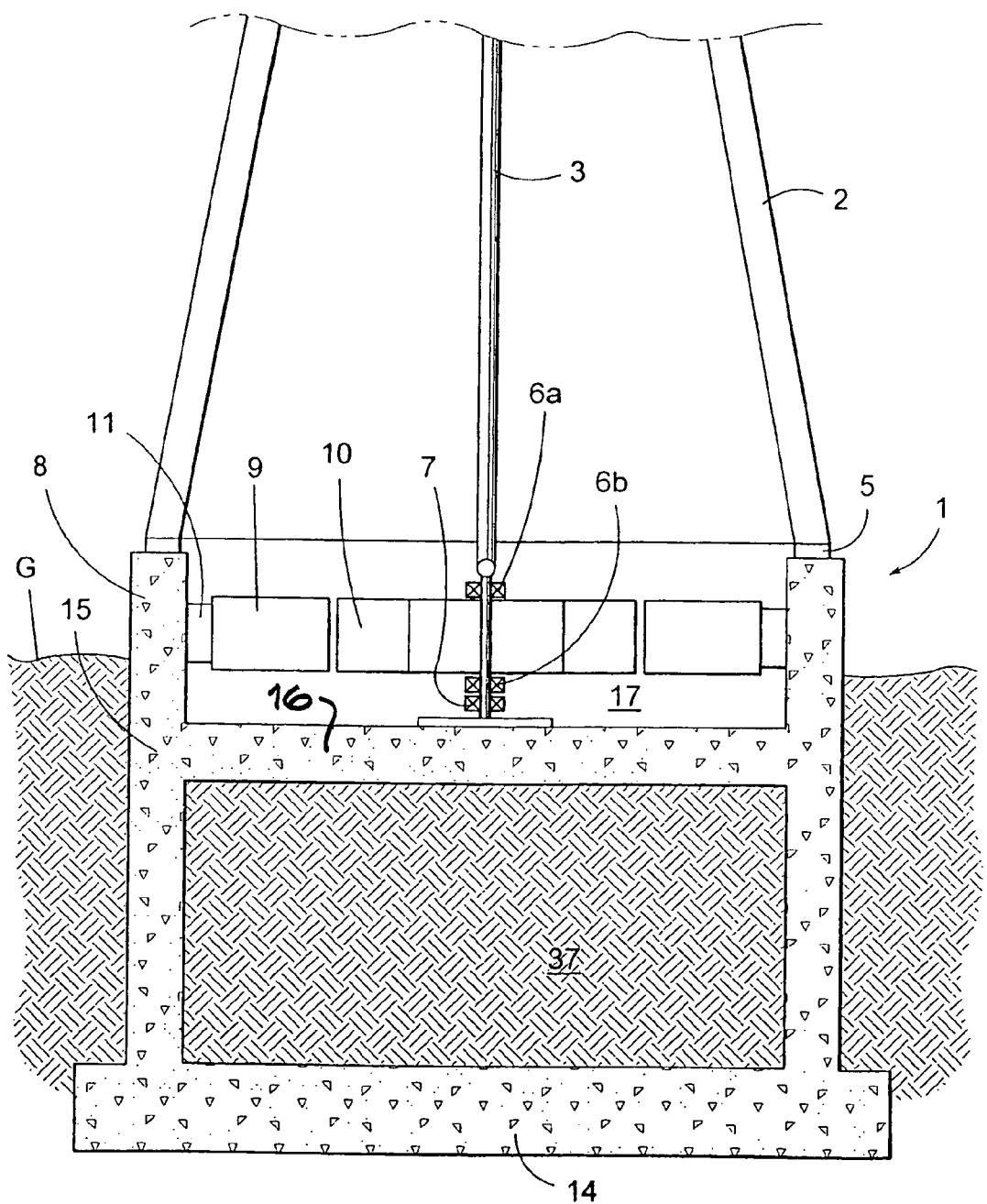
FIG. 2 is a vertical section through the lower part of the wind-power unit in FIG. 1.

The foundation 1 and the lower part of the supporting pillar 2 are shown in cross-section in FIG. 2. The foundation consists of a circular bottom plate 14, a cylindrical part 15, which extends upward from the bottom plate 14 and a floor plate 16 arranged in the cylindrical part 15, such that a cavity 37 is formed between the foundation parts 14, 15, 16. An upper section 8 of the cylindrical part 15 forms, together with the floor plate 16, a generator room 17 in which the generator 8, 9, 10 of the unit is arranged. The bottom plate 14 of the foundation and the lower section of the cylindrical part 15 thereof are digged down in the ground G.

The supporting pillar 2 is anchored at the upper end of the foundation 1 by means of a number of anchoring elements 5.

The rotor shaft 3 of the unit extends down in the generator room 17 and is rotationally fixedly connected with the rotor 10 of the generator. The rotor shaft is mounted in radial bearings 6a, 6b above as well as under the rotor 10 and in thrust bearings 7 on the underside of the rotor.

The stator of the generator is divided into a winding-supporting part 9 and a frame 8. The frame 8 consists of the upper section of the foundation 1. The winding-supporting part 9 of the stator and the frame 8 thereof are interconnected by a number of, suitably three joints 11, which are evenly distributed in the circumferential direction.

Figure 3:
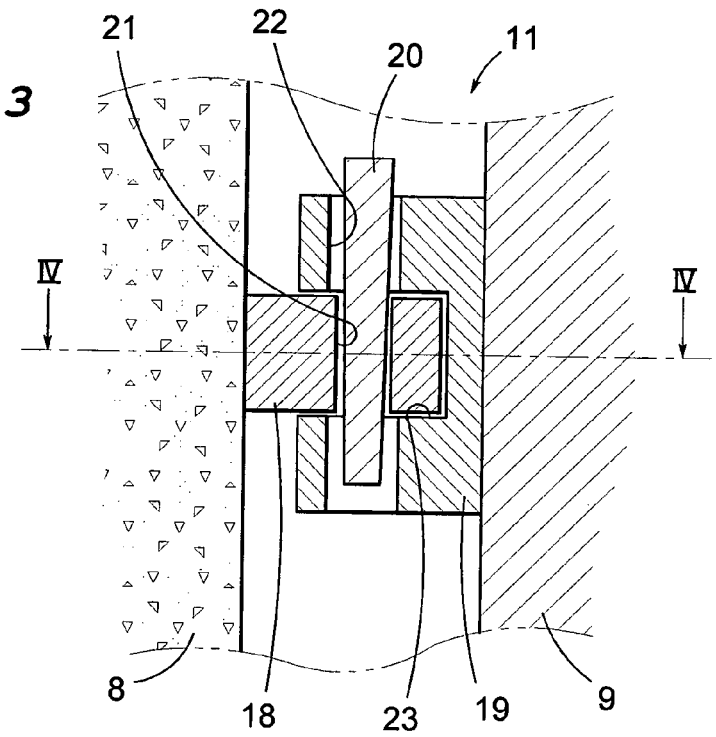
FIG. 3 is a vertical section through a detail in FIG. 2.
Figure 4:
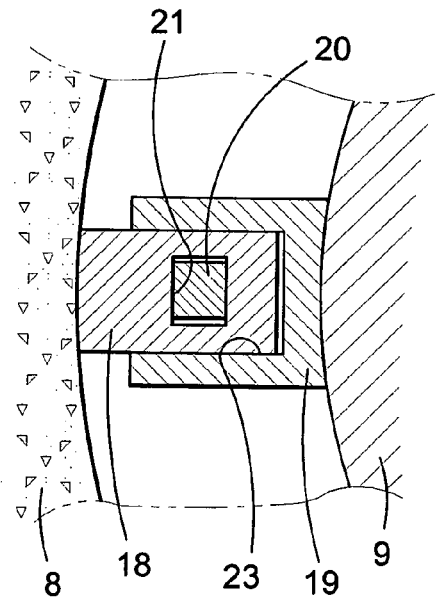
FIG. 4 is a section along the line IV-IV in FIG. 3.

Such a joint 11 is illustrated in more detail in FIGS. 3 and 4 in a vertical and horizontal, respectively, section. The joint comprises a coupling element 18 embedded in the frame 8 and a welded steel heel 19 having a slot 23 at the winding-supporting part 9 of the stator. The coupling element 18 extends into the slot 23 of the heel 19. The coupling element 18 has a vertical through hole 21, forming a clamp. The heel 19 has likewise a vertical through hole 22 at the slot-provided portion thereof and which extends through the parts situated over as well as under is the slot. The respective holes 21, 22 of the clamp and of the heel 19 are situated right opposite each other. A wedge element 20 is driven-in through the holes 21, 22 so that the winding-supporting part 9 and the frame are fixedly interconnected.

By driving in the wedge 20 differently far, the distance between the winding-supporting part 9 and the frame 8 can be regulated so that adjustability for centering of the winding-supporting part 9 around the rotor of the generator is provided.

Figure 5:
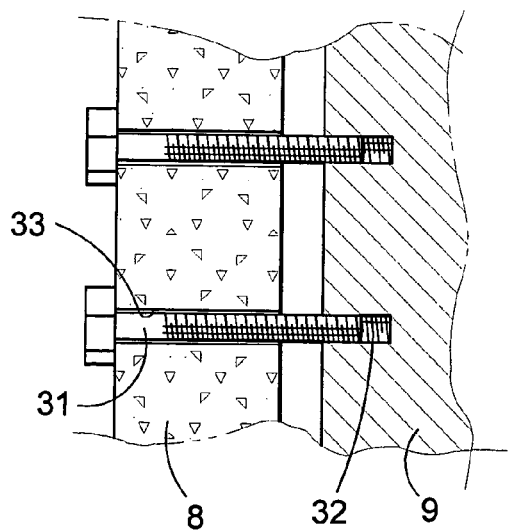
FIG. 5 is a section corresponding to the one in FIG. 3, illustrating an alternative embodiment example.

In FIG. 5, an alternative embodiment is illustrated, where each joint that connects the winding-supporting part 9 and the frame 8 with each other consists of a bolt 31, which extends with clearance through a hole 33 of the frame 8 and into a threaded drilling 32 of the winding-supporting part 9.

The invention claimed is:

1. A wind-power unit with vertical axis comprising a wind turbine, a generator with vertical axis connected with the wind turbine, a supporting pillar supporting the wind turbine and a foundation for the supporting pillar, wherein the stator of the generator is integrated with the foundation by the fact that the stator has a winding-supporting part connected with a frame of concrete by at least three joints distributed in a circumferential direction, which frame also constitutes a part of the foundation, and said part of the foundation surrounds the generator radially.

2. The wind-power unit according to claim 1, wherein at least one of the joints comprises a coupling member arranged at the winding-supporting part of the stator and a coupling member arranged at the frame, one of the coupling members having a slot and the other coupling member comprising a portion having a through hole projecting into the slot and the joint furthermore comprising a wedge element fixing said portion in the slot.

3. The wind-power unit according to claim 1, wherein one of the joints is a bolt joint.

4. The wind-power unit according to claim 3, wherein at least two of the joints are adjustable in a radial direction relative to an axis of the generator.

5. The wind-power unit according to claim 1, wherein the foundation comprises a concrete structure having a lower part having a cavity, which cavity is filled with a backing sand.

6. The wind-power unit according to claim 5, wherein the foundation is arranged for placement on the bottom of the sea, the height of the foundation being adapted so that the part of the foundation situated above the cavity is above the surface of the sea.

7. The wind-power unit according to claim 1, wherein the generator is a synchronous generator.

8. The wind-power unit according to claim 1, wherein the generator is permanent magnetized.

9. The wind-power unit according to claim 1, wherein the generator is connected with an AC or DC mains.

10. The wind-power unit according to claim 9, wherein the generator is connected with a 50 or 60 Hz mains via a DC intermediary.

11. An electric mains connected to a wind-power unit according to claim 1.

12. A method in the production of a foundation for a wind-power unit with vertical axis, at which the foundation is arranged for a supporting pillar supporting the wind turbine of the wind power unit, wherein the stator to a generator is integrated with the foundation by the fact that the foundation is cast of concrete and is connected with a winding-supporting part of the stator by at least three joints distributed in the circumferential direction so that the foundation forms the frame of the stator and so that said part of the foundation surrounds the generator radially.

* * * * *